Sept. 7, 1926.
F. N. ROSS
1,599,146
BUTTON FEEDING AND POSITIONING MEANS AND METHOD
Filed July 1, 1925 10 Sheets-Sheet 1
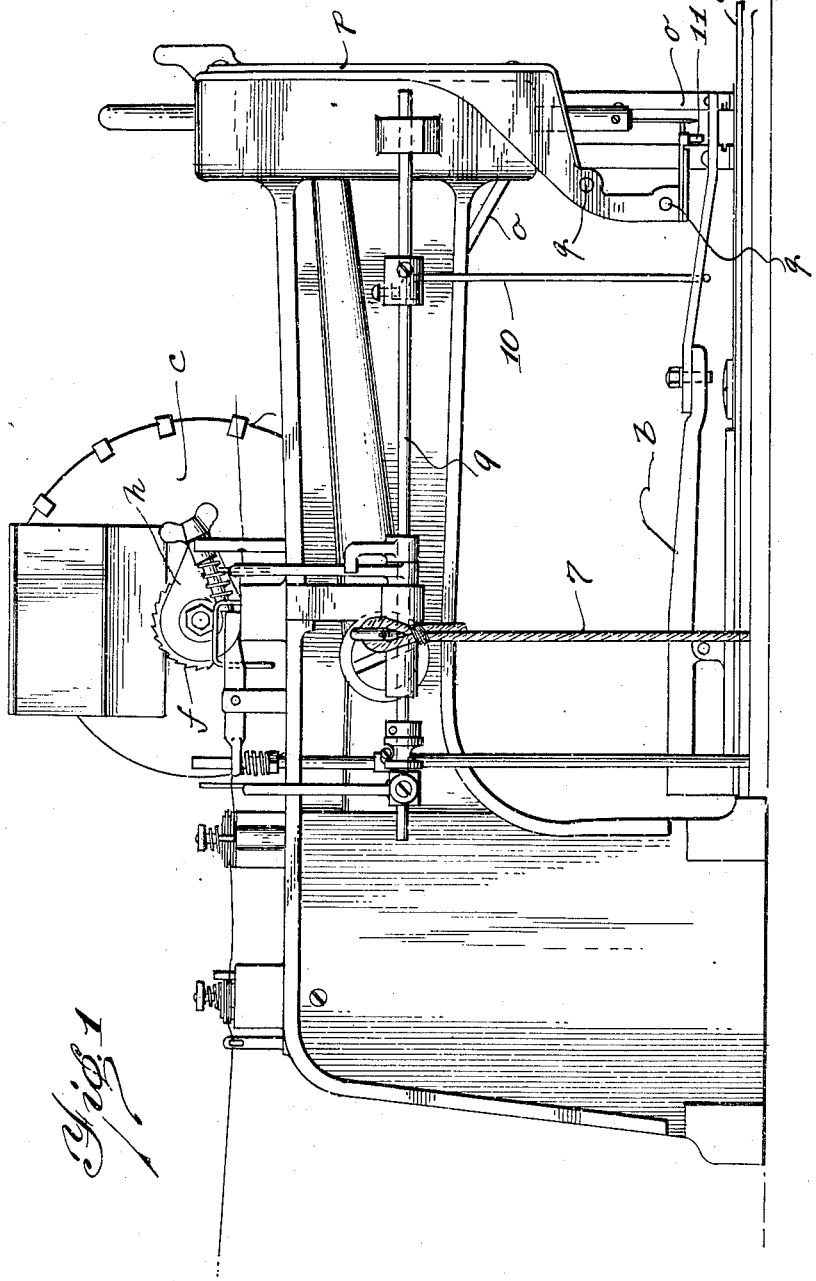
INVENTOR.
Frederick N. Ross.
BY
Stuart C. Barnes
ATTORNEY.

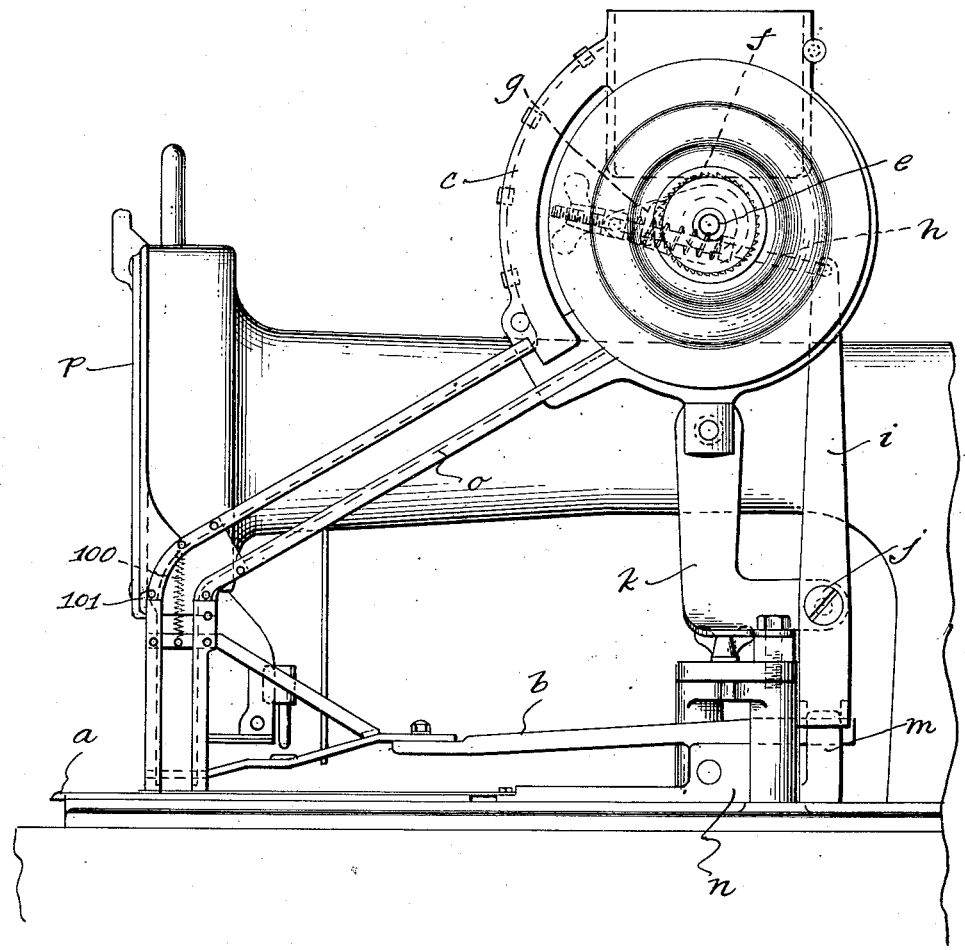

Sept. 7, 1926. 1,599,146
F. N. ROSS
BUTTON FEEDING AND POSITIONING MEANS AND METHOD
Filed July 1, 1925 10 Sheets-Sheet 3
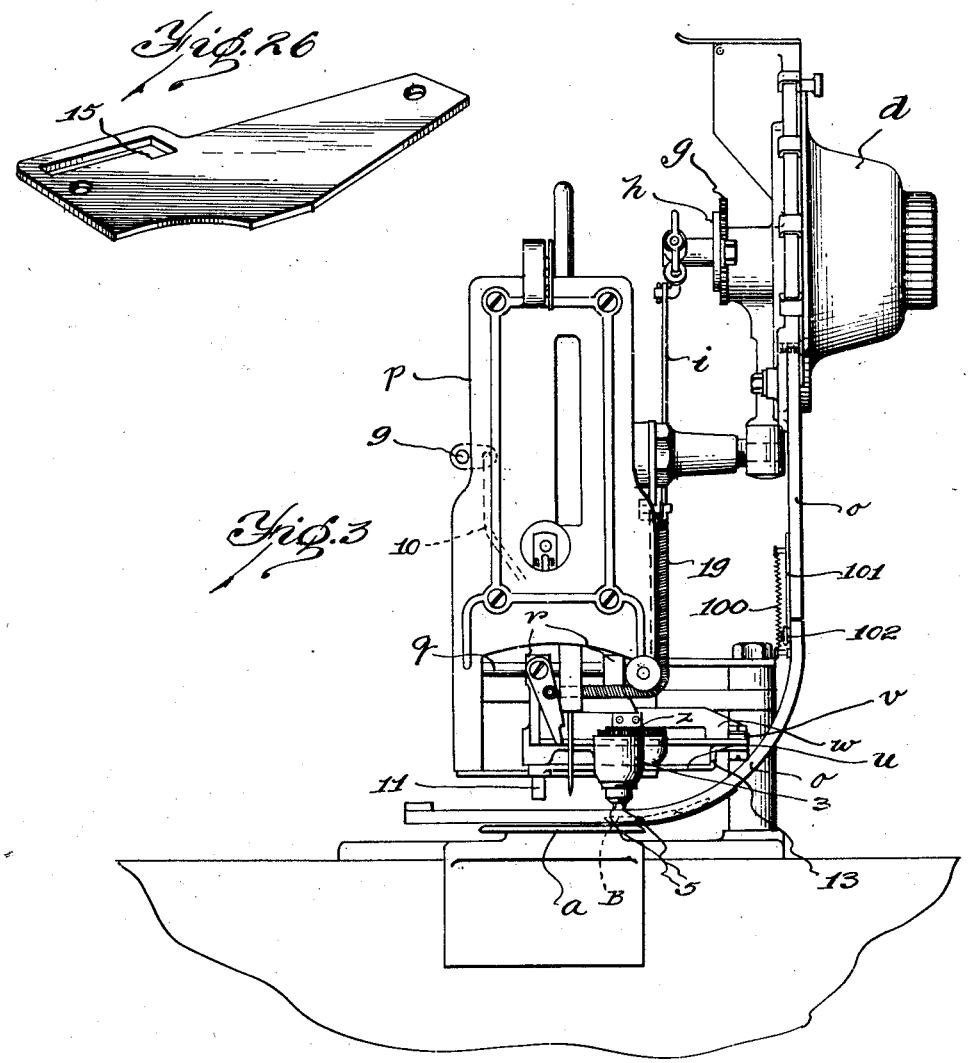
INVENTOR.
Frederick N. Ross
BY
Stuart C Barnes
ATTORNEY.

Sept. 7, 1926.
F. N. ROSS
1,599,146
BUTTON FEEDING AND POSITIONING MEANS AND METHOD
Filed July 1, 1925
10 Sheets-Sheet 4
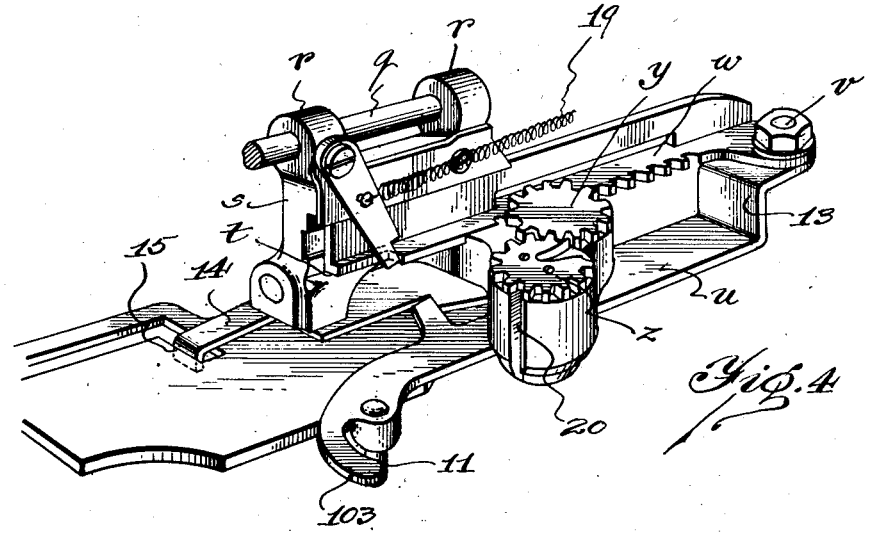
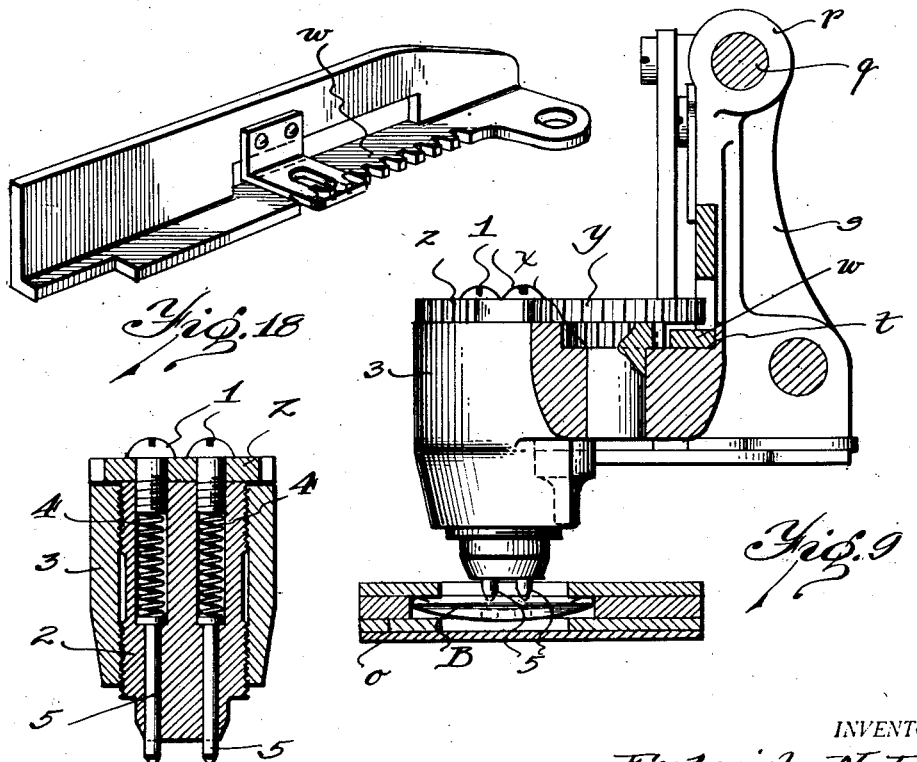
INVENTOR.
Frederick N. Ross
BY
Stuart C. Barnes
ATTORNEY.

Sept. 7, 1926.
F. N. ROSS
1,599,146
BUTTON FEEDING AND POSITIONING MEANS AND METHOD
Filed July 1, 1925
10 Sheets-Sheet 5
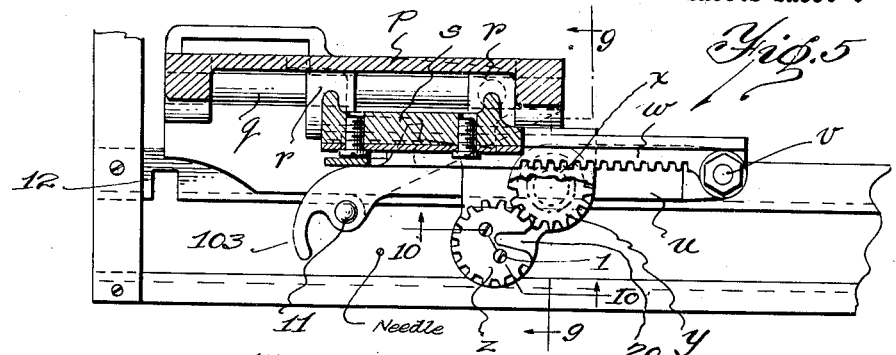
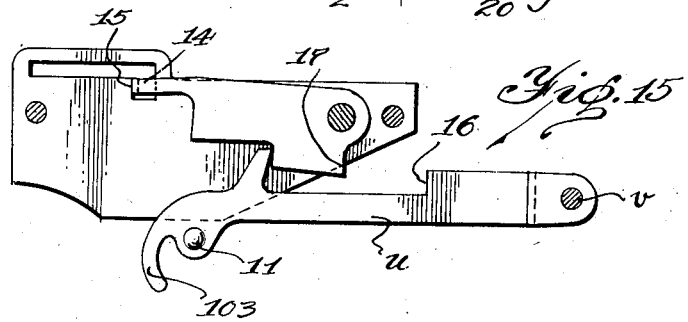
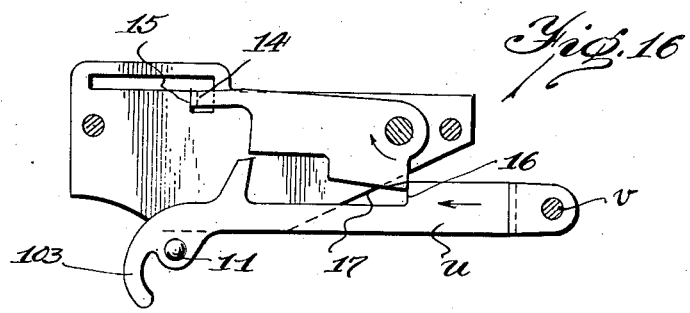
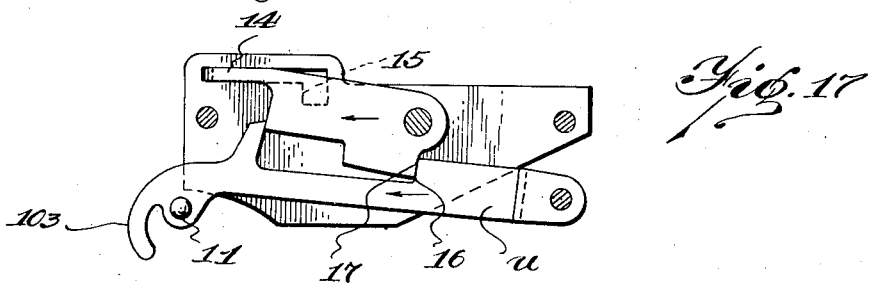
INVENTOR.
Frederick N. Ross
BY
Stuart C. Barnes
ATTORNEY.

Sept. 7, 1926.
F. N. ROSS
1,599,146
BUTTON FEEDING AND POSITIONING MEANS AND METHOD
Filed July 1, 1925  10 Sheets-Sheet 6
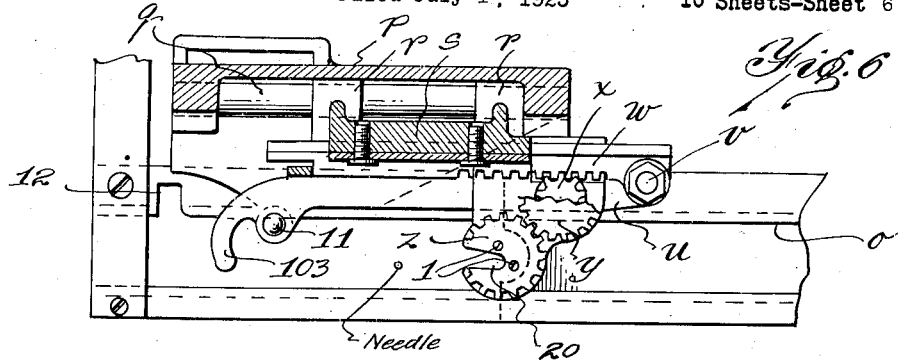
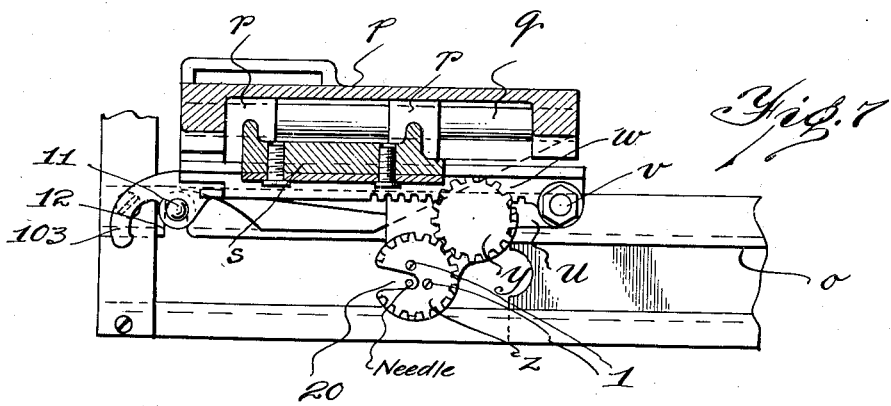
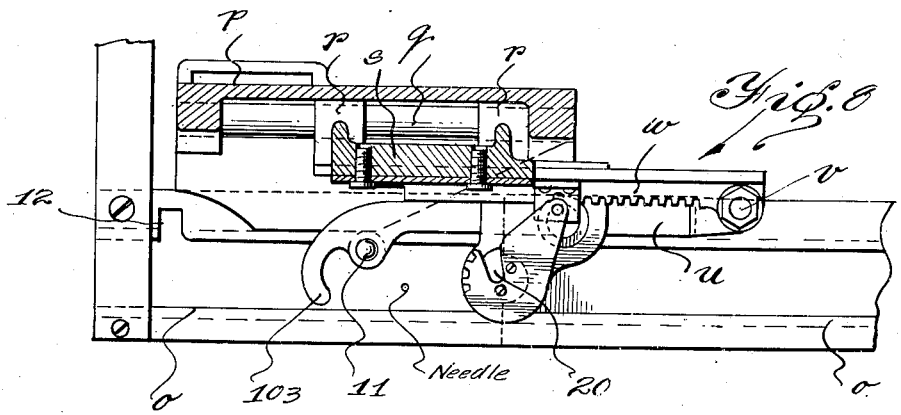
INVENTOR.
Frederick N. Ross
BY
Stuart C. Barnes
ATTORNEY.

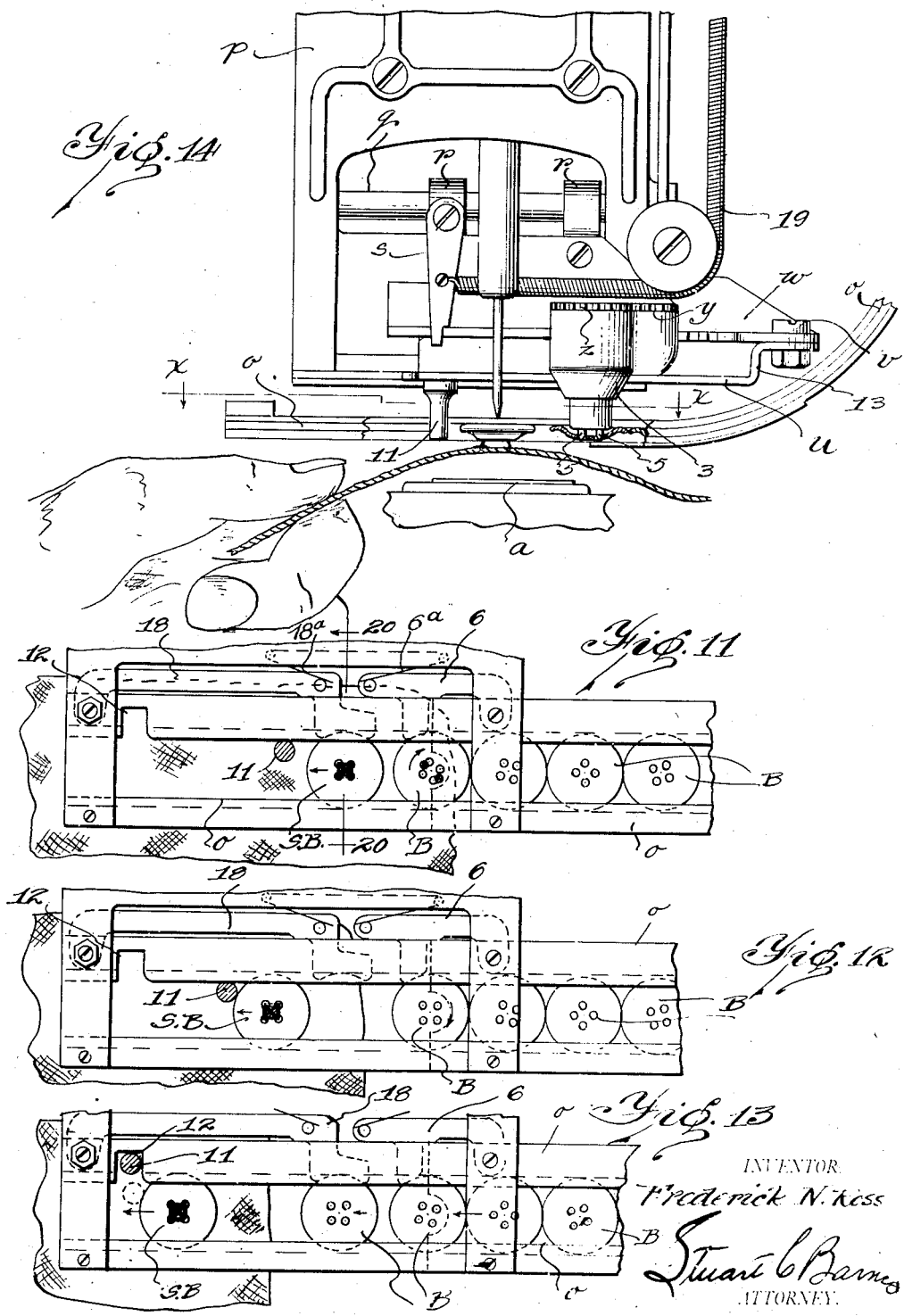

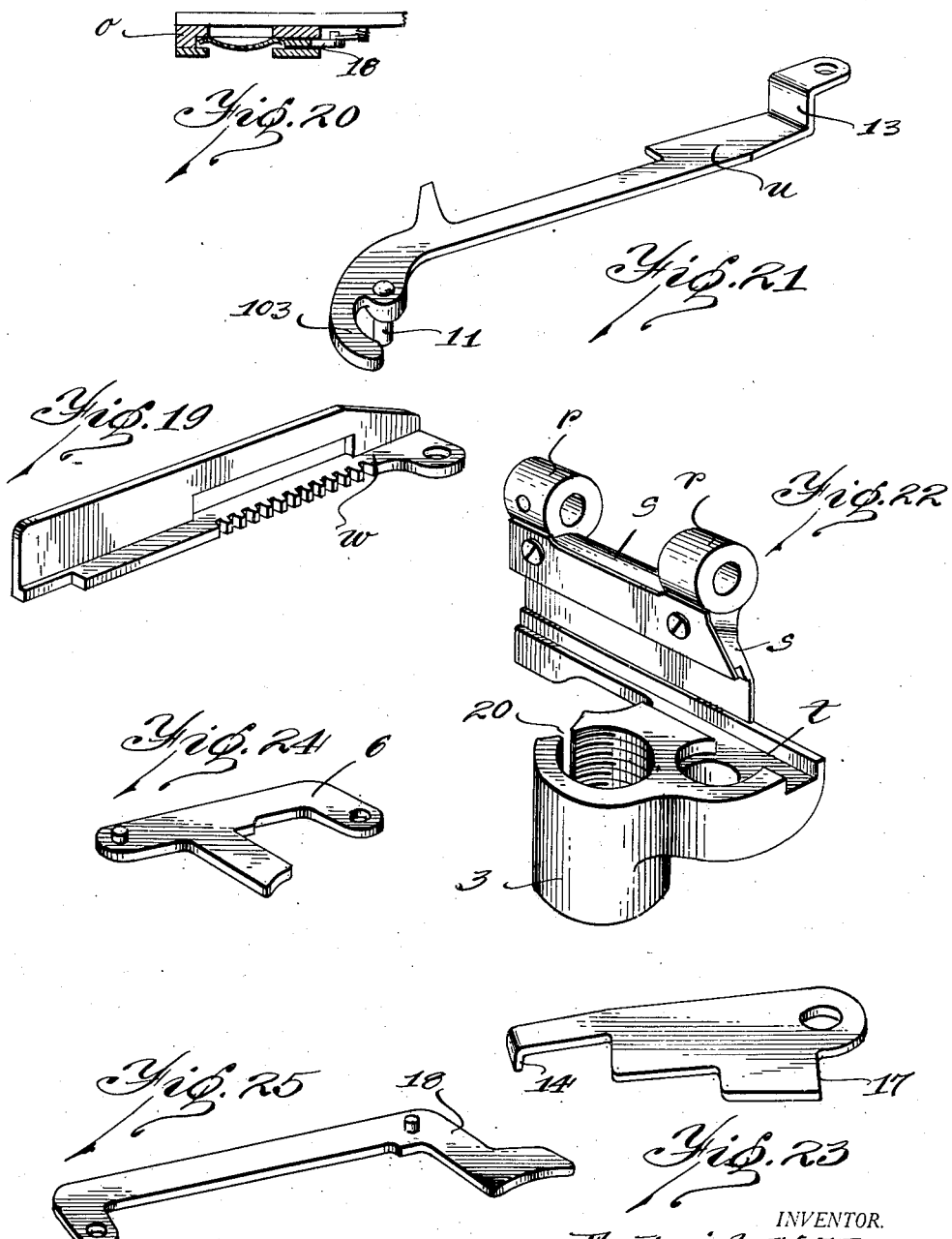

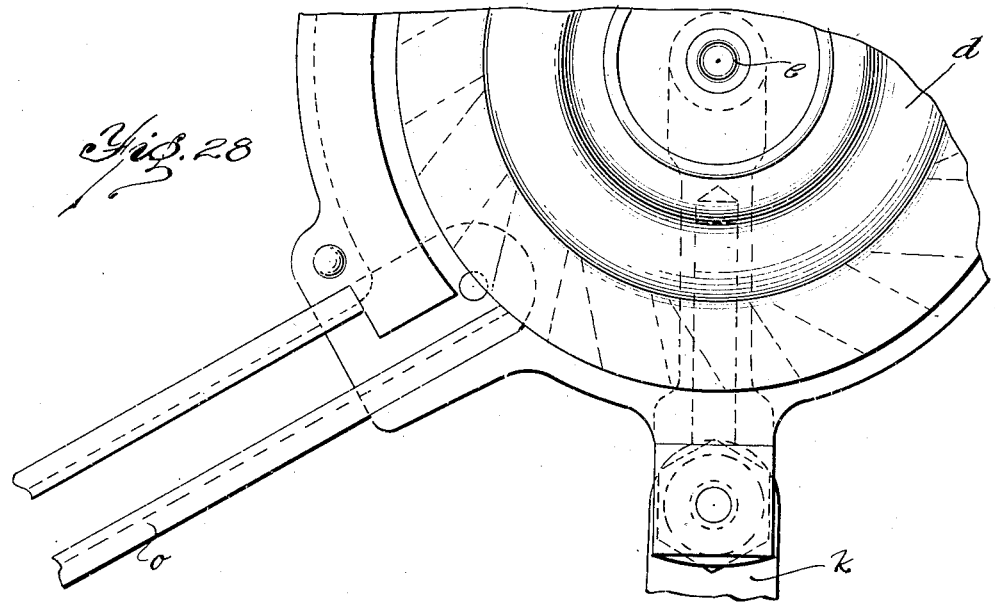
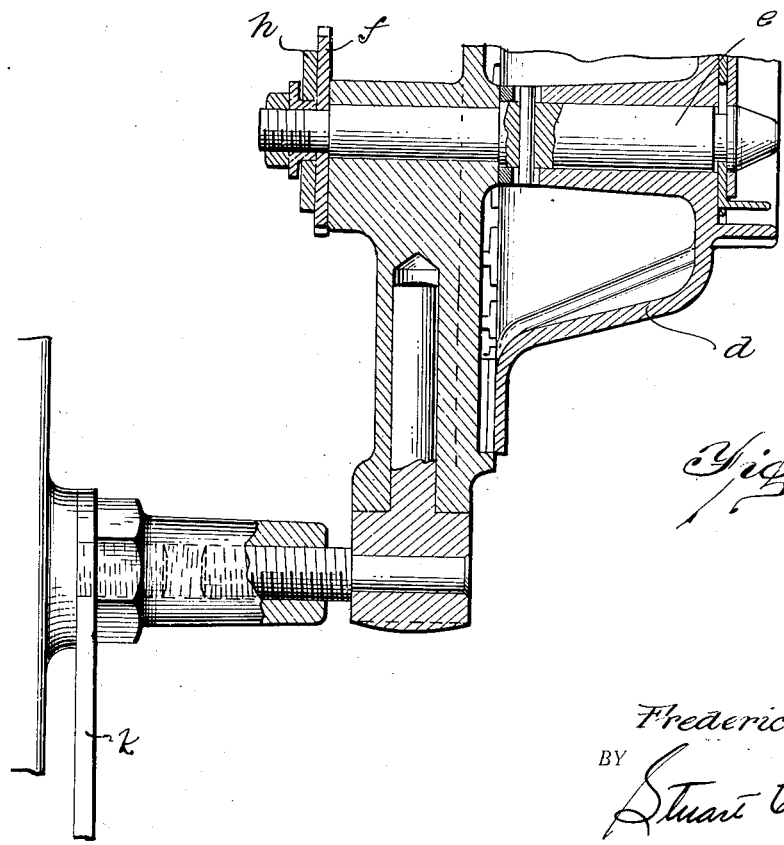

Sept. 7, 1926.
F. N. ROSS
1,599,146
BUTTON FEEDING AND POSITIONING MEANS AND METHOD
Filed July 1, 1925 10 Sheets-Sheet 10
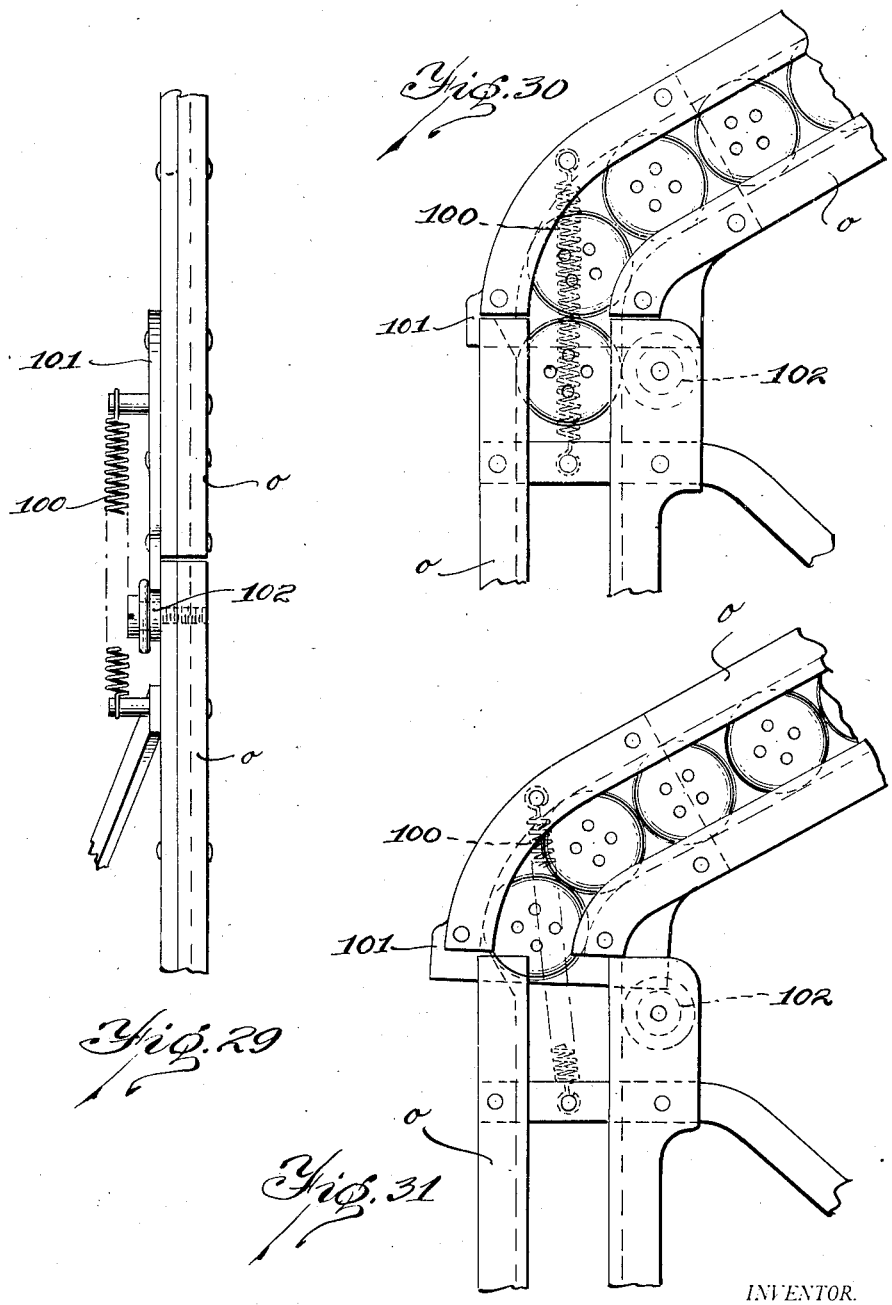
INVENTOR.
Frederick N. Ross.
BY
Stuart C Barnes
ATTORNEY.

Patented Sept. 7, 1926.

1,599,146

UNITED STATES PATENT OFFICE.

FREDERICK N. ROSS, OF DETROIT, MICHIGAN, ASSIGNOR TO PATENT BUTTON COMPANY, OF WATERBURY, CONNECTICUT, A CORPORATION OF CONNECTICUT.

BUTTON FEEDING AND POSITIONING MEANS AND METHOD.

Application filed July 1, 1925. Serial No. 40,744.

This invention relates to a machine for sewing on buttons, especially for sewing buttons on fabrics.

Machines for this purpose are not broadly new. The only machines, so far as I am advised, which have proven commercially practical, are those in which the button is located and the eyes properly positioned with respect to the needle by hand. This is a relatively slow operation. If not properly positioned the needle comes down on the button and breaks; this is costly, and the flying needle parts are dangerous to the operator.

It is true that the prior art discloses some machines in which it has been sought to automatically feed and position the button and also machines in which a hand-operated device attempts to feed and locate the button. However, so far as I am able to learn, none of these machines have proven commercially successful.

One of the problems confronting the designer of an automatic machine is the provision of the necessary power to effect the feeding and positioning operation during the periods of rest and the sewing operations. Obviously at this time in the ordinary sewing machine base there are no moving parts with which to furnish the movements required for automatically feeding and positioning of the button. I have overcome this difficulty by utilizing the pull of the garment in removing the sewed-on button to effect the placing of the next button under the needle, and the proper positioning of the eyes with respect to the needle. Added to this, the device constitutes an accurate gauge to locate the precise point on the garment where the next button is to be sewed. So far as I am advised this is an entirely new idea in button sewing machines, and involves an entirely new mode of operation in machines of this class.

The design of the machine is such that my improvement may be attached to the present design of button sewing machines. The machine may be manufactured in the form of attachments which can be directly applied to these existing machines. The mechanism which I am about to describe involves a large amount of novelty which cannot be very well concisely summarized in a preamble, but which will be apparent to one skilled in the art, as the detailed description unfolds, and which will be made the basis of the claims at the end of the specification.

Referring to the drawings:

Fig. 1 is a side elevation of a common form of button sewing machine known as the "Osan" machine, to which my attachment can be applied.

Fig. 2 is a side elevation taken from the other side of the machine.

Fig. 3 is an elevation looking at the front of this machine.

Fig. 4 is a perspective view of the assembled feeding and button-eye positioning means.

Fig. 5 is a plan view of the same mechanism, partly in section.

Figs. 6, 7 and 8 are similar views showing this same mechanism—in Fig. 6, in the path of travel toward the needle; in Fig. 7 arrived at the needle, and in Fig. 8, returned to its initial position. This Fig. 8, however, shows a slightly modified form which is applicable only to 4-eye buttons.

Fig. 9 is an elevational view, partly in section, showing the button-eye locating device prepared for the finding operation, taken on the line 9—9 of Fig. 5.

Fig. 10 is a vertical cross sectional view of the button-eye finding and positioning device, taken on the line 10—10 of Fig. 5.

Figs. 11, 12 and 13 are plan views showing various positions of the sewed-on button and the next button which is fed and positioned by the pull on the garment. These are sections taken on the line $x—x$ of Fig. 14.

Fig. 14 is an enlarged elevational view showing how the pull on the garment effects the feeding and the button-eye positioning operations.

Figs. 15, 16, and 17 are plan views showing the operation of the button feeding carriage lock.

Fig. 18 is a detail perspective of the rack used in the feeding and locating device of the 4-eye button type shown in Fig. 8.

Fig. 19 is a perspective view of the rack that can handle either the 2-eye or 4-eye buttons.

Fig. 20 is a cross section taken on the line 20—20 of Fig. 11.

Fig. 21 is a detailed perspective of the drag link used in connection with the button feeding and positioning means.

Fig. 22 is a detail perspective of the casting which forms the main feed carriage.

Fig. 23 is a detail of a locking dog whose operation is indicated in Figs. 15 to 17.

Fig. 24 is a detail of the button-chute stop whose operation is indicated in Figs. 11 to 13.

Fig. 25 is a detail of the botton-holding jaw, which is indicated in Figs. 11 to 13.

Fig. 26 is a detail of the locking dog plate, whose operation is indicated in Figs. 15 to 17 inclusive.

Figs. 27 and 28 are detail views of the universal joint type of mounting for the hopper.

Figs. 29 to 31 are details of the joint between the upper and lower chute sections.

It is old and common in the art of sewing buttons on by machinery to provide a sewing machine having a pair of clamping jaws positioned under the needle on the presser foot arm for holding the button. Machines for this purpose are now on the market and they are provided with suitable mechanism embodied in the bed of the machine for oscillating these clamping jaws, bringing the needle successively through the different eyes of the button in any order that may seem desirable. Such a machine is the so-called "Osan" machine, and there are several others. It is customary for the operator to insert the button with the fingers under the needle and position the eye so that the gripping jaws hold the button eyes in what appears to be the correct position under the needle. This is a difficult job, and in the haste that always occurs, is very often negligently done, with the result that the needle comes down, strikes the body of the button and breaks; very often it may fly in the face of the operator, making the job a relatively dangerous one unless some suitable shield is afforded.

As stated in the preamble, unsuccessful efforts have been made to provide a hand-operated feed and button-eye positioning device to assure a precision of location that cannot be accomplished where the human element intervenes, and also machines for automatically feeding and positioning the button on these vibrating holding jaws.

These sewing machines are ordinarily provided with a work-supporting arm $a$ (Fig. 2), which is connected with the presser foot arm $b$. It is here that my attachment is attached and takes the place of the ordinary presser foot arm with the button gripping jaws, which are fed by hand, and I preferably construct the parts carried by the presser foot arm of not greater weight than the weight of the parts of the standard machine which they replace.

Referring to Fig. 2, it will be seen that $c$ designates the button hopper which is supported on a horizontal pivot and also a vertical pivot to give it a universal joint mounting so that it can oscillate with the vibrations of the presser foot arm and the work-supporting arm. This is more fully shown in Figs. 27 and 28. This hopper comprises a large cup $d$, which is secured to the end of the shaft $e$ on the end of which is mounted the ratchet wheel $f$, which is actuated by a pawl $g$ which in turn is carried on the oscillating lever $h$. The end of this lever is connected to a second lever $i$, which is pivoted at $j$ on the bracket $k$. The end of this lever $i$ fits loosely over the stud $m$, projecting upwardly from the vibrating base $n$ of the presser foot arm, and the work-supporting arm. Hence as this base is vibrated back and forth to properly locate the button-eyes under the needle it simultaneously oscillates the lever $i$ on its pivot $j$ and continuously rotates the button hopper through the ratchet wheel and pawl drive. These vibrations will turn the button hopper about one half a revolution for every button. This serves to keep the buttons stirred up so that they may feed down through the chute $o$. This chute turns and runs under the needle (see Fig. 3). This hopper is adapted to feed the buttons to the chute right side out. The details of this mechanism are shown in my copending application No. 40,141, filed June 29th, 1925.

It will be noticed from Figs. 29 and 31 that by unhooking the spring 100 the upper chute and hopper can be detached from the bottom section of the chute. There are two purposes for this. One is so that the hopper may be removed for cleaning out or for changing buttons. A second purpose is to remove the weight of the hopper from the presser foot arm, the operating parts of which are designed only for the usual button clamping jaws. To this same end the joint between the upper and lower chute sections permits a limited relative movement by reason of the plate 101 attached to the upper section riding on the roller 102.

My attachment comprises also a plate $p$, which is secured to the face of the sewing head in place of the ordinary cover plate. The lower end of this plate has a pair of yoke arms which carry the cross shaft $q$ (see Fig. 14). This forms a track which passes through the hanger arms $r$ of the carriage, shown in detail in Fig. 4. This carriage is made up of a casting $s$, a detail of which is shown in Fig. 22. This casting is grooved as at $t$ for the purpose of supporting a sub-carriage that comprises the drag link $u$ (Fig. 4) and the rack $w$ pivoted together at $v$. The teeth of this rack $w$ (Fig. 9) mesh with the pinion $x$ which drives the gear $y$, which in turn drives the mutilated gear $z$. Refer to Fig. 10. The mutilated gear is secured by the screws 1 to the rotor 2, which travels in a slightly helical path due to being supported in the rotor socket 3, by screw threads. These machine screws 1 also form abutments for the coil springs 4 which press upon the finder pins 5. This rotor, together with the devices it supports, forms a button-eye finding and positioning device. Its operation will presently be described.

It is thought that the shortest and clearest way to describe the parts is to at once describe the operation. The buttons feed down through the chute o by reason of the agitation which has already been described with respect to the hopper. This, of course, is a gravity feed. As they come down the chute, the foremost button strikes the button stop lever 6 resiliently held in place by a spring 6ª (Fig. 11 detailed in Fig. 24; see also Fig. 20). This stops the column of buttons. The operator places her foot on the pedal (not shown); this pulls down on the draft cord 7 (Fig. 1), which serves to raise the presser foot arm 8 in a familiar way, through the interposition of the rock shaft 9 and the link 10. This also carries up with it the lower end of the feed chute o which is secured to an extension of the presser foot arm.

Now refer to Fig. 1. This shows the chute o before it has been raised with the button B in its lower position. When the chute o rises, it obviously carries the button up with it. If two of the holes in the button register with the plunger pins 5, these simply slip in and find the button-eyes. If the eyes do not register with the pins, the pins simply rise slightly in their sockets due to the yield permitted by the springs 4; (see Fig. 14.)

However, there is already one button that has been correctly positioned in the gripping jaws under the needle when the last garment was withdrawn from the machine. The operator releases the pressure on the pedal, which lets down the presser foot arm and then with another pedal (not shown) the sewing machine is started, and the button is sewed through its several eyes in a familiar way, the presser foot arm and the work-supporting arm being vibrated and oscillated by mechanism well known in the art, and which is not here detailed. This oscillation and vibration serves to bring the button-eyes in any prescribed order under the needle to complete the sewing operation, as already explained. In the meantime the feeding hopper is turned half a revolution to agitate the buttons.

The button sewing operation having been completed, the operator raises the presser foot which as already explained again brings the button B against the finding pins 5. The operator then grasps the work, as shown in Fig. 14, and pulls the work to the left. The sewed-on button designated in Figs. 11 to 13—SB, is still caught in the chute o; as it is dragged along this chute it picks up the pin 11. If one refers to Fig. 4 it will be seen that the pin 11 is part of the sub-carriage formed by the drag link u and the rack w. Now again referring to Figs. 12 and 13, it will be seen that the sewed-on button drags this pin 11 until it snaps into the harbor 12. The sewed-on button has now disengaged itself from the carriage. The drag link u is provided with a hook 103 so that it can be worked by hand to start the first button.

This travel of the sewed-on button and sub-carriage together has performed two important operations. In the initial part of the travel it has moved only the sub-carriage together with its rack w. This movement of the sub-carriage relatively to the main carriage s has, by reason of the rack teeth engaging the pinion x, served to turn the gear z and the rotor 2, thereby bringing the finding pins into the button-eyes if they are not already located there. This rotation continues always for the same prescribed amount,—substantially half a turn. This means that the button pins always stop in the same position and hence always leave the button-eyes in a given position. This movement is stopped when the shoulder 13 (Fig. 4) strikes the main carriage s. During this initial movement the main carriage is locked against any movement by reason of the locking finger 14 (Fig. 4) engaging behind the shoulder 15. If reference be now made to Figs. 15 to 17, it will be seen how the locking device is released. The drag link u is provided with a shoulder 16 which near the end of the movement of the sub-carriage strikes the locking dog shoulder 17, as shown in Fig. 17. This swings the dog on its pivot, releases the locking finger 14, as shown in Fig. 17. The sub-carriage now picks up the main carriage. The rotation of the finding device having picked up the button, and the rotation of the finding device having correctly positioned it, the last part of the movement of the garment therefore moves the main carriage, which now carries the button finding device longitudinally along the chute. This is nicely depicted in Figs. 12 and 13, where it will be seen that the unsewed button B travels from the end of the column of buttons to the clamping jaw 18, which is resiliently positioned by a spring 18ª. At this point the pin 11, as already stated, drops into the harbor 12.

The operator now appreciates that the next button is positioned by reason of the release of the tension on the cloth. If this distance of button travel is just exactly the spacing desired in the sewed-on buttons, this will afford a fairly accurate gauge for the position of the sewed-on buttons. If, on the other hand, it is desired that the buttons be further apart, the operator may continue to pull on the garment until the desired location for the button appears on the garment under the needle. The operator now releases the pressure on the foot pedal and the presser foot arm drops down.

Referring to Fig. 14, it will be seen that when the chute o drops down onto the work and the work-supporting arm, it will clear the pin 11. The pin 11 is now released and the tractile spring 19 will now cause the main carriage and the sub-carriage to fly back to their initial position. The sewing machine may now be started and the foot arm is then again raised, the garment pulled to the left both finding and positioning the button-eyes and drawing the button under the needle. The mutilation in the gear and also the slot 20 (Fig. 7) in the rotor is for the purpose of allowing the rotor to straddle the needle as it brings the button in place.

The form of device shown in Figs. 6 and 7, where the travel of the rotor is about half a revolution is intended for 2-eye and 4-eye buttons; the form of device shown in Fig. 8 is intended only for 4-eye buttons and has no intervening gear.

This apparatus is designed primarily for feeding and positioning buttons with eyes to the needle of a sewing machine, but it obviously has a broader application. For instance, it can be used for feeding and positioning such buttons for a stapling machine for applying the buttons to a card. We have therefore thought it desirable in most of the claims to make a broader reference to the machine with which it is used, and we have therefore, in a good many of the claims, referred to the needle as means for fastening the buttons to a web through the eyes of the button.

I desire it to be understood that the claims hereinafter following are not to be strictly limited to feeding and attaching buttons of the eye type, where the subject matter covered by the claims is capable of use with buttons of other types, such for instance, as the bar type of button where the opening on either side of the bar may be considered an eye, and within the meaning of the claim. It would seem advisable in describing the structure in the claims to use the term "eye" for more explicitly identifying the structure, but let it be known that the term "eye" is used in a descriptive sense rather than in a limitative sense.

The device shown in Fig. 8 is a modification intended for use only with four hole buttons, as in place of an intervening set of gears, x and y, the finder is rotated by a link and slot connection which would obviously not turn the button as far as the gears.

What I claim is:

1. In a machine for sewing on buttons or attaching buttons to a web, the combination of means for attaching the button to the web through the eyes of the button, and means operated by the shifting of the work for feeding the buttons to such attaching means.

2. In a machine for sewing on buttons or attaching buttons to a web, the combination of means for attaching the button to the web through the eyes of the button, and means actuated by the shifting of the work for positioning and feeding the buttons to said attaching means.

3. In a machine for sewing on buttons or attaching buttons to a web, the combination of means for fastening a button to a web through the eyes of the button, means for turning the button to make the eyes thereof assume a proper relation with respect to said fastening means, and means operated by the shifting of the work for actuating said second named means.

4. In a machine for sewing on buttons or attaching buttons to a web, the combination of means for fastening a button to the web through the eyes of a button, a guide for guiding the button to such fastening means, and means actuated by the removal of the attached button for forcing the buttons along said guide to said fastening means.

5. In a machine for sewing on buttons or attaching buttons to a web, the combination of means for fastening a button to the web through the eyes of the button, a guide for guiding the buttons to such fastening means, and means operated by the shifting of the work for turning the button in such guide to properly position the eyes of the button.

6. In a machine for sewing on buttons or attaching buttons to a web, the combination of a chute extending to a position beneath the fastening means for guiding and feeding the buttons, a finder for positioning the buttons, and means for raising said chute to position the buttons in operative relation to said finder.

7. In a machine for sewing on buttons or attaching buttons to a web, the combination of a chute extending to a position beneath the fastening means for guiding and feeding the buttons, a rotatable finder for positioning and feeding the buttons, and means for raising said chute to position the buttons in operative relation to said finder.

8. In a machine for attaching buttons to a web, the combination of a chute for guiding the buttons to a position directly beneath said attaching means, and rotatable means for positioning the eyes of the buttons and feeding successive buttons to attaching position.

9. In a machine for attaching buttons to a web, the combination of a chute for guiding the buttons to a position beneath said attaching means, and means actuated by the removal of the attached buttons for positioning the eyes of the buttons and feeding successive buttons to attaching position.

10. A machine for attaching buttons to a web comprising button-attaching means, work-clamping means having a chute for guiding buttons directly beneath said attaching means, means for retaining a button in a predetermined position in said chute and a button-positioning device having rotatable means arranged to engage said button upon work-releasing movement of said work-clamping means operable to move the engaged button along the chute to attaching position and means operable during such movement to rotate said button-engaging means to locate properly the button eyes in alinement with the attaching means.

11. A machine for attaching buttons to a web comprising button-attaching means, work-clamping means having a chute for guiding buttons directly beneath said attaching means, means for retaining a button in a predetermined position in said chute and a button-positioning device arranged to engage said button upon work-releasing movement of said work-clamping means provided with means to be engaged by a button previously secured to the web and operable by the movement of the web when so engaged to move the button engaged by the positioning device to attaching position.

12. A machine for successively attaching buttons to a web comprising button-attaching means and work-clamping means having a chute provided with a horizontal portion extending beneath and beyond said attaching means and a section inclined upwardly therefrom to receive a series of buttons, means for arresting the lowermost button of said series in the horizontal portion of said chute and a reciprocable button-positioning device positioned to engage the arrested button upon work-releasing movement of said work-clamping means and operable to move said button to button-attaching position.

13. A machine for attaching buttons to a web comprising a head having a needle reciprocable therein, work-clamping means and complemental stitch-forming mechanism, a chute carried by said work clamp, a main carriage reciprocably mounted on said head, a supplemental carriage having a rotatable eye finder slidably mounted on said main carriage primarily movable relatively thereto and subsequently movable therewith, means to arrest the lowermost button in said chute beneath said finder, means for raising said work-clamping device to cause the arrested button to engage said finder, means for rotating said finder during the initial movement of said supplemental carriage to cause said finder to enter the button eyes and rotate the button to a predetermined position whereby continued conjoint movement of said carriages will properly position said button in attaching position.

14. Button feeding mechanism for a button attaching machine having a head provided with reciprocable attaching means comprising an inclined chute to receive a series of buttons having a horizontal section extending beneath and beyond said attaching means, button engaging and transferring means carried by said head and reciprocable in parallelism with said chute, means for arresting the lowermost button in said chute in alinement with said transferring means and means for raising said chute to cause the arrested button to be engaged by the transferring means whereby said transferring means may be actuated to slide the button along said chute to attaching position and means for retaining said button in attaching position.

15. In a machine for sewing on buttons or attaching buttons to a web, the combination of means for attaching a button to the web through the eyes of the button, a guide for directing the buttons to the attaching means, and a carriage and sub-carriage including a rotating finding and positioning member operated by a movement of the sub-carriage with respect to the main carriage, the movement of the main carriage with the sub-carriage serving to feed the button along the guide to the attaching means.

16. In a machine for sewing on buttons or attaching buttons to a web, the combination of means for attaching a button to the web through the eyes of the button, a guide for directing the button to the attaching means, a combined main carriage and sub-carriage including a rotating finding member for positioning the eyes of the button, said carriages being provided with devices whereby a movement necessary in otherwise operating the machine causes initial movement between the sub-carriage and the main carriage.

17. In a machine for sewing on buttons or attaching buttons to a web, the combination of means for fastening a button to the web through the eyes of the button, a guide for directing the button to the fastening means, and a combined main carriage and sub-carriage including a rotating finding member for positioning the eyes of the button operated by relative movement between the two carriages, said carriages provided with devices caught on the previously sewed-on button for causing first the relative movement between the carriages to position the button and then the combined movement of the carriages to feed the button to the fastening means.

18. In a machine for sewing on buttons or attaching buttons to a web, the combination of means for fastening a button to the web through the eyes of the button, means for guiding a button to the fastening means, a combined main and sub-carriage arranged to have initial relative movement and including a rotating finding device for positioning the eyes of a button operated by such relative movement, means for locking the main carriage against rectilinear movement during the relative movement between the carriages, and the said carriages provided with devices whereby a movement otherwise necessary in the operation of the machine causes first relative movement between the carriages then unlocks the main carriage and causes the combined movement of the carriages to feed the button to the fastening means.

19. In a machine for sewing on buttons or attaching buttons to a web, the combination of means for fastening a button to the web through the eyes of the button, a guide for directing the buttons to the fastening means, and a two-part carriage in which the parts have initial relative movement and provided with a rotating finding member operated by such relative movement to position the eyes of the buttons and in which the carriages have a combined longitudinal movement for feeding the button to the fastening means, said carriages having devices whereby a movement otherwise necessary in the operation of the machine causes said carriages to be automatically operated.

20. In a machine for sewing on buttons or attaching buttons to a web, a rotatable button-eye finding and positioning element comprising a supporting member provided with screw threads and a rotor having threads fitted into the threads of the supporting member and provided with a plurality of pins for finding the button-eyes.

21. In a machine for sewing on buttons or attaching buttons to a web, the combination of means for fastening a button to the web through the eyes of the button, a chute for guiding buttons to such fastening means including a slot in the wall of the chute to form a harbor, and a carriage for doing work in connection with the passage of the button to the fastening means and including a pivoted drag link for catching onto the previously sewed-on button by reason of a projecting pin, said pin and the said harbor co-operating to permit the retreat of the pin and the escape of the previously sewed on button at the proper time.

22. In a machine for sewing on buttons or attaching buttons to a web, the combination of means for fastening a button to the web through the eyes of the button, a chute for directing the buttons to the fastening means, and a carriage for doing work on the button in connection with its passage through the chute to the fastening means, said carriage provided with a pivoted drag link having a portion arranged to be caught by the previously sewed-on button to furnish the effort to do the work required of the carriage.

23. In a machine for sewing on buttons or attaching buttons to a web, the combination of means for fastening a button to the web through the eyes of the button, a chute for guiding the buttons to a position beneath the fastening means, a releasable stop for stopping the column of gravity fed buttons in the chute, and means for positively taking the forward button in the column against the resistance of the releasable stop and positively feeding it to the fastening means.

24. In a machine for sewing on buttons or attaching buttons to a web, the combination of means for fastening a button to the web through the eyes of the button, an inclined chute for directing the buttons to the fastening means, a stop for holding the buttons back in a column, and a gripping member for positioning the button in the chute under the fastening means, and means for positively taking the forward button in the column against the resistance of the stop and positively feeding it to the gripping lever under the fastening means.

25. In a machine for sewing on buttons or attaching buttons to a web, the combination of means for fastening a button to a web through the eyes of the button, a chute for delivering buttons to said fastening means, a releasable stop for holding back the buttons in a column, a gripping member for holding the buttons under the fastening means, and means for positively taking the forward button out of the column against the resistance of the stop and rotating the same to properly position the eyes and deliver the same to the gripping member at the final end of the chute.

26. The method of sewing buttons, having eyes, to a web which comprises positioning the eyes of the button with respect to the fastening means, oscillating the positioned button to permit the entrance of the fastening means through the positioned eyes, guiding a button to the fastening means and connecting the button while so guided to the previously sewed on button and then shifting the work and removing the previously sewed on button to effect the feeding of said guided button to its position beneath the fastening means.

27. The method of operating a sewing machine for fastening buttons having eyes to a web, which comprises the guiding of the buttons to the fastening means and while so guided connecting each with the previously sewed-on button to cause such guided button to be turned for the purpose of positioning its eyes with respect to the fastening means whereby the removal of the sewed-on button furnishes the effort for the said turning action.

28. The method of sewing on buttons on a machine provided with means for gripping a button and oscillating the same under the needle, which comprises the guiding of a button to the needle and while being so guided coupling the same up with the previously sewed-on button to cause as the latter is removed both longitudinal travel of the guided button and turning movement of such button for the purpose of both feeding the button and positioning the eyes of the button properly with respect to the needle.

29. The method of feeding and positioning buttons for a sewing machine having a reciprocating needle and a presser foot arm provided with a button gripping mechanism, which comprises storing the buttons in a column, guiding the buttons one by one to the reciprocating needle and while the buttons are so guided coupling each up with the preceding sewed-on button to cause a partial rotation of the button while so guided, and for positively feeding the guided button from such column to its proper position under the needle.

30. In a machine for sewing on buttons or attaching buttons to a web, the combination of a button chute section, a presser foot arm on which the said button chute section is carried, and a second button chute section separately supported and connected up with the first mentioned button chute section and held thereto by a spring and a joint permitting relative movement between the two.

31. In a machine for sewing on buttons or attaching buttons to a web, the combination of a button chute section, a presser foot arm on which the said button chute section is carried, and a second button chute section connected up to the first mentioned button chute section by a slip joint permitting relative movement between the two, and including a plate on one of the sections slidable on a roller supported on the other section.

32. The method of feeding and positioning buttons in a machine for attaching same to a web, which comprises attaching one button, feeding another button toward attaching position and turning the button to properly position the eyes by the removal of said attached button from attaching position.

33. The method of positioning buttons in a machine for attaching same to a web, which comprises attaching one button and positioning the eyes of and feeding another button to the attaching position by the removal of said attached button from attaching position.

In testimony whereof I have affixed my signature.

FREDERICK N. ROSS.